US006816508B1

(12) United States Patent
Sokol

(10) Patent No.: US 6,816,508 B1
(45) Date of Patent: Nov. 9, 2004

(54) METHOD FOR MAPPING A SERVICE ATTRIBUTE PERTAINING TO A CONNECTION ORIENTED COMMUNICATIONS NETWORK IN A CONNECTIONLESS COMMUNICATIONS NETWORK AND VICE VERSA

(75) Inventor: Joachim Sokol, Unterhaching (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/600,531

(22) PCT Filed: Jan. 7, 1999

(86) PCT No.: PCT/DE99/00014

§ 371 (c)(1),
(2), (4) Date: Oct. 11, 2000

(87) PCT Pub. No.: WO99/37116

PCT Pub. Date: Jul. 22, 1999

(30) Foreign Application Priority Data

Jan. 19, 1998 (DE) .......................................... 198 01 773

(51) Int. Cl.[7] ................................................. H04J 3/16
(52) U.S. Cl. ............. 370/466; 370/395.53; 370/395.54; 370/401
(58) Field of Search ......................... 370/395.1, 395.53, 370/395.54, 395.65, 401, 412, 466, 467

(56) References Cited

U.S. PATENT DOCUMENTS 5,163,045 A * 11/1992 Caram et al. ................ 370/409
5,764,645 A * 6/1998 Bernet et al. ........... 370/395.52
6,081,836 A * 6/2000 Karapetkov et al. ........ 709/218
6,169,739 B1 * 1/2001 Isoyama ................. 370/395.54
6,175,569 B1 * 1/2001 Ellington et al. ........... 370/401
6,178,171 B1 * 1/2001 Alexander et al. ..... 370/395.54
6,606,323 B1 * 8/2003 Ramamurthy et al. . 370/395.53

FOREIGN PATENT DOCUMENTS

EP          0 479 478 A2    4/1992
WO        WO 96/35988       11/1996

OTHER PUBLICATIONS

Siegmund, "Grundlagen der Vermittlungstechnik", pp. 177–185.
LAN Emulation Over ATM Specification—Version 1.0, 7. Address Resolution Protocol, Procedures and Frame Formats, ATM Forum, pp. 86–95 and "8. Data Transfer Protocol and Procedures", pp. 96–102.
ATM—Vermittlungstechnik, pp. 420–428.
International Telecommunication Union, I.363.
International Telecommunication Union, Q.2110.

* cited by examiner

*Primary Examiner*—Chau Nguyen
*Assistant Examiner*—Christine Ng
(74) *Attorney, Agent, or Firm*—Morrison & Foerster LLP

(57) ABSTRACT

The method makes it possible to image a quality of service feature (distinguishing between high-priority and low-priority data streams) that is available in a connection-oriented communication network into a connectionless communication network. The application is the connection of an ATM network to a local area network (LAN), whereby the LAN has the aforementioned quality of service feature available to it and a distinction between high-priority data streams and low-priority data streams is possible with an imaging rule beyond the boundary ATM-LAN.

5 Claims, 3 Drawing Sheets

METHOD FOR MAPPING A SERVICE ATTRIBUTE PERTAINING TO A CONNECTION ORIENTED COMMUNICATIONS NETWORK IN A CONNECTIONLESS COMMUNICATIONS NETWORK AND VICE VERSA

BACKGROUND OF THE INVENTION

1. Field of the Invention

The present invention is directed to a method for imaging a quality of service feature available in a connection-oriented communication network and that distinguishes a high-priority data stream from a low-priority data stream into a connectionless communication network and vice versa.

2. Description of the Related Art

A local area network, referred to as a LAN below, is known from Gerd Sigmund, Grundlagen der Vermittlungstecnik. In a LAN, data is transmitted by the transport of data packets (data of limited length). The data packets contain a source address and a destination address and are spontaneously sent, i.e. without a previous connection setup (connectionless communication).

A quality of service feature references one option from a plurality of possible options that are characteristic of a given communication network. What is thereby understood, for example, is an operating mode or an additional service of the communication network. One quality of service feature in the ATM network is the identifier for the transmission of a high-priority data stream, i.e. of a data stream that requires a secure transmission (see below) according to specific criteria (see below), as distinguished from a low-priority data stream that, accordingly, does not require a secure transmission.

What is to be understood by a transparent transmission or, respectively, a transparent data stream is a transmission or a data stream whose content is transmitted without an analysis. The conversion of the content into control information and data only ensues in the destination system. This corresponds to the view of the OSI layer model according to the ISO definition (ISO=International Standardization Organization) which is familiar to a person skilled in the art. A layer-by-layer view is also expedient and standard in the framework of communications technology beyond the OSI layer model.

Gerd Sigmund, Grundlagen der Vermittlungstechnik discloses an ATM network (ATM=asynchronous transfer mode). The ATM network works connection-oriented, i.e. the data transmission is composed of a connection setup, of an information transmission and a connection cleardown. Further details can be derived from the above mentioned publication and numerous other sources as well as the corresponding standards.

It is known to connect a LAN, for example as an Ethernet or a Token Ring, to an ATM network. Prescribable changes in the definition of the LAN are to be thereby undertaken; in this context, one speaks of a LAN emulation, also referred to as LANE. Let the corresponding LANE definition of the "ATM Forum" be referenced for farther-reaching information (see ATM Forum: LAN Emulation over ATM V1.0, ATM Forum LANE-0021.00).

The LANE described in the publication ATM Forum: LAN Emulation over ATM V1.0, ATM Forum LANE-0021.000 has the disadvantage that no use of the quality of service features (QoS) defined in the ATM network is possible. Since such quality of service features are likewise not available in the connected LANs, for example the Ethernet, there is no possibility of different handling of data streams, i.e. of a distinction between low-priority and high-priority data streams, as is standard in the ATM network.

However, it is possible to expand the existing LANE or the traditional LAN as well to the effect that such a discrimination into low-priority and high-priority data streams can be made. Such an expansion can be derived from the international patent application PCT/DE97/00404 filed 4 Mar. 1997 and shall be summarized again below. Such an expanded LAN is referred to below as LANE2.

Up to now, the quality of service features have been lost at every transition between a LANE2 and an ATM network.

SUMMARY OF THE INVENTION

An object of the present invention is comprised in imaging a quality of service feature available in a connection-oriented communication network, namely the discrimination between a high-priority and a low-priority data stream, into a connectionless communication network and vice versa.

This object is achieved by a method for imaging a quality of service feature available in a connection-oriented communication network that identifies a high-priority data stream or a low-priority data stream into a connectionless communication network and vice versa, a) whereby a first, low-priority data stream from the connection-oriented communication network is transparently imaged into the connectionless communication network;

b) whereby a first high-priority data stream from the connection-oriented communication network is transparently imaged into the connectionless communication network;

c) whereby a second low-priority data stream from the connectionless communication network is imaged in to the connection-oriented communication network, whereby an address conversion of an address of the connectionless communication network into an address of the connection-oriented communication network is implemented;

d) whereby a second-priority data stream from the connectionless communication network is imaged into the connection-oriented communication network, in that when the second high-priority data stream is a matter of a signaling packet, a conversion of a signaling information of the signaling packet from the connectionless communication network into a signaling information available in the connection-oriented communication network is implemented, and when the second high-priority data stream is a matter of an information packet, a transparent transmission into the connection-oriented communication network is implemented.

The present invention images a quality of service feature available in a connection-oriented communication network into a connectionless communication network. The aforementioned ATM network is an example of a connection-oriented communication network, and likewise aforementioned LANE with a corresponding expansion is an example of a connectionless communication network.

A first low-priority data stream or a first high-priority data stream is transmitted transparently from the connection-oriented communication network into the connectionless communication network. A second low-priority data stream is transmitted from the connectionless communication network into the connection-oriented communication network, whereby an address conversion of an address of the connectionless communication network into an address of the connection-oriented communication network is implemented. A second high-priority data stream is imaged from the connectionless communication network into the connection-oriented communication network in that—when the second high-priority data stream is a signalling packet—a conversion of a signalling information of the signalling packet from the connectionless communication network into a signalling information available in the connection-oriented communication network is implemented or—when the second high-priority data stream is a matter of an information packet—a transparent transmission into the connection-oriented communication network is implemented.

A first development of the invention describes the conversion of quality of service parameters that are available in the connectionless communication network into the connection-oriented communication network in the following steps:

a suitable bandwidth for a new connection is defined from the available bandwidth;

an appertaining address of the connection-oriented communication network is defined from the address of the connectionless communication network by an address conversion;

the connection is set up when a suitable bandwidth is available and the address of an appertaining subscriber in the connection-oriented communication network is known.

Another development is comprised therein that the connection-oriented communication network is an ATM network and the address of the connection-oriented communication network is an ATM address.

An additional development is comprised therein that the connectionless communication network is a LAN, whereby the address of the connectionless communication network is a LAN address. This LAN corresponds to the initially cited version LANE2 expanded by the high-priority/low-priority quality of service feature.

A next development is comprised in the embodiment of the address conversion (from the LAN into the ATM network). An ATM address is found for a prescribable LAN address in that either the LAN address is available on a LANE server or via specifically set up connections to all neighboring nodes.

Developments of the invention provide that the quality of service parameter available in the connectionless communication network from the signaling packet is converted into the connection-oriented communication network in the following steps:

a) a suitable bandwidth from the total bandwidth available is defined for a new connection;

b) the suitable address of the connection-oriented communication network is defined from the address of the connectionless communication network on the basis of an address conversion;

c) when a suitable bandwidth is available and when the address is known in the connection oriented communication network, the new connection is set up;

d) when no suitable bandwidth is available or when the address is unknown in the connection-oriented communication network, then a prescribable error message is displayed.

An additional improvement provides that the connection-oriented communication network is an ATM network and the address of the connection-oriented communication network is an ATM address. The connectionless communication network may also be a local area network (LAN) that is expanded by the quality of service feature of being able to distinguish between a high-priority and a low-priority data stream, and the address of the connectionless communication network is an LAN address. In these, the address conversion is implemented in the following steps:

a) the ATM address for the LAN address is determined by an LAN server or b) when the ATM address is not locally available, an inquiry is implemented at an ATM server, whereby the ATM address is communicated from the ATM server as reply.

BRIEF DESCRIPTION OF THE DRAWINGS

Exemplary embodiments of the invention are presented in greater detail on the basis of the following Figures.

DETAILED DESCRIPTION OF THE PREFERRED EMBODIMENTS

DESCRIPTION OF THE KNOWN EXPANSION OF THE LAN STANDARD FOR DISTINGUISHING BETWEEN A HIGH-PRIORITY AND A LOW-PRIORITY DATA STREAM (SEE PATENT APPLICATION PCT/DE97/00404):

As indicated above, the content of the patent application, PCT/DE97/00404 filed 4 Mar. 1997, which is incorporated herein by reference is summarized below.

Figure 2:
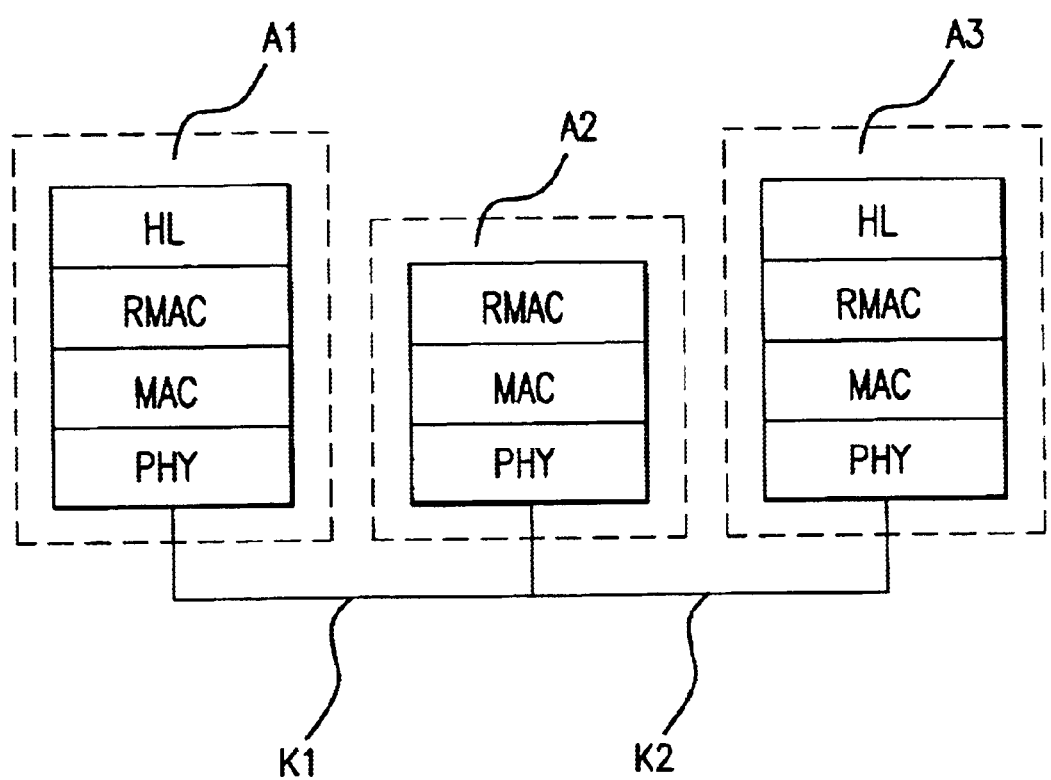
FIG. 2 is a sketch that shows three arrangements that are part of a communication relationship, shown in a layer model (ISO)

FIG. 2 shows a first arrangement A1, a second arrangement A2 and a third arrangement A3, whereby the first arrangement A1 is connected to the second arrangement A2 via a channel K1 and the second arrangement is connected to the third arrangement A3 via a channel K2.

Both the first arrangement A1 as well as the third arrangement A3 represent terminal equipment that work according to the Ethernet standard. The second arrangement shows an Ethernet switching node an (Ethernet switch). Data packets (information packets and/or signalling packets) are sent via the channels K1 and K2.

According to the Ethernet Standard, standardized layers according to ISO (International Standardization Organization) are shown for each arrangement in FIG. 2. The coupling of the channels K1 and K2 occurs via a physical layer PHY (bit transmission layer). An Ethernet layer MAC (Media Access Control) lies above the physical layer, this assuring the functionality of the standardized Ethernet protocol.

One expansion of the Ethernet standard is comprised in an insertion of a layer RMAC (Realtime Media Access Control) between the Ethernet layer MAC and the higher layers HL (Network and Transport Protocols, for example TCP/IP (Transport Control Protocols/Internet Protocol) or UDP/IP (User Datagram Protocol/Internet Protocol)).

The second arrangement A2 in FIG. 2 is the Ethernet switching node and has no higher layers each available to it, since these are not required for a switching functionality.

Among the services performed by the layer RMAC is to allocate a priority class to a data packet, whereby the data packet is correspondingly marked and ultimately transmitted. A receiver, for example the third arrangement A3, determines the priority class of the data packet and potentially forwards the data packet or makes the information contained in the data packet transparently available to the higher layers HL.

Four priority classes are preferably distinguished:

1. A first priority class PK0 is suitable for connectionless data transmission. The data packet is transmitted without a connection setup and without assurance for a successful transmission (no confirmation). The first priority class PK0 represents the lowest priority that can be assigned to a data packet.

2. A second priority class PK1 corresponds to a connection-oriented transmission wherein a controlled delay in the transmission of the data packet is assured on a statistical average, whereby the following service features are realized:
   a bandwidth needed for the connection is assured, this being defined during the connection setup;
   an average delay in the transmission of the data packet, even given a higher load on the communication network, is no poorer than a delay of a transmission with data packets to which the priority class PK0 has been assigned;
   a greatest possible tardiness of the data packet (with the priority class PK1) is less than the tardiness of a data packet having the priority class PK0;
   a loss rate in the transmission of data packets of the priority class PK1 is of no significance insofar as conditions declared in the connection setup for the communication connection are adhered to.

3. A third priority class PK2 relates to a connection-oriented transmission.
   The following service features are provided for this:
   most data packets are completely transmitted;
   a maximum delay time defined by a prescribable threshold is not exceeded for most data packets.

4. Finally, a fourth priority class PK3, which is likewise provided for connection-oriented transmission, corresponds to the highest priority that can be assigned to a data packet. A reliable transmission can be assured in any case, whereby the following service features are provided:
   the bandwidth negotiated during the connection setup is offered for the transmission;
   prescribable, maximum delay times are guaranteed;
   no losses of data packets occur due to overflows in buffer memories.

As long as the communication network does not collapse, one can assume a dependable and fastest possible transmission given allocation of a data packet to priority class PK3.

A distinction is made between only two priority classes in the present case in view of the linking of the LAN to the ATM network: data with high priority as high-priority data stream and data with low priority as low-priority data stream.

Corresponding to the above-described allocation of a priority class to a data packet, an identification of the data packet is also undertaken, whereby the format defined in the Ethernet standard is thereby provided with a corresponding expansion for the RMAC concept.

FIG. 3 shows the data packet in different formats and with different contents (and functionalities).

Figure 3A:
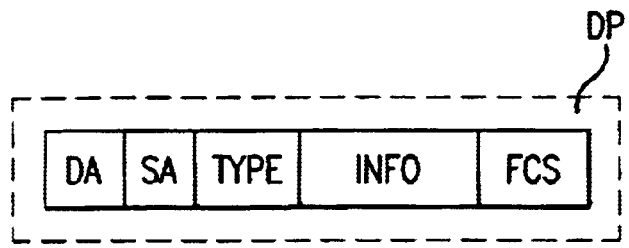
FIG. 3 is a sketch that shows various protocol formats of the Ethernet standard and an expansion according to a RMAC concept.

FIG. 3a shows a data packet defined in the Ethernet standard and having the fields:

Destination address DA;

Source address SA;

Field TYPE:
   The field TYPE contains a whole number, preferably having a length of two octets. Dependant on the value, the significance of the field TYPE is differently interpreted:
   TYPE<1500: Interpretation as a length field (data packet corresponds to an LLC format (Logical Link Control));
   TYPE≧1500: Interpretation as a type particular (code for the network protocol);

A field INFO contains further service features or data or, respectively, signaling information that are normally transparently transmitted to the higher layers HL;

a field FCS contains a check sum for error correction.

Figure 3B:
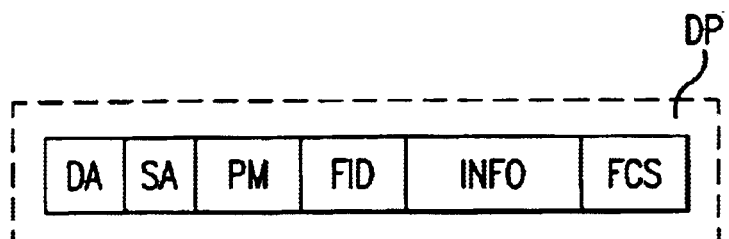
Figure 3C:
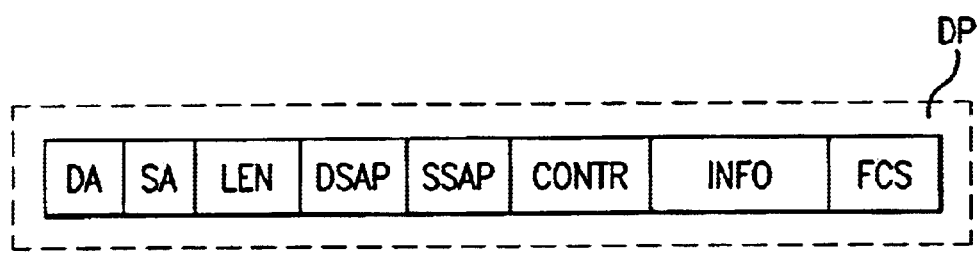

The LLC format is shown in FIG. 3c. In addition to the above-presented fields, the following fields are present here:
   a field LEN corresponds to the length field (the field TYPE from FIG. 3a contains a value that is less than 1500, wherewith the field TYPE migrates to the field LEN);
   a field DSAP (Destination Service Access Point) represents a service access point of the receiver;
   a field SSAP (Source Service Access Point) contains a service access point of the sender;
   a field CONTROL comprises one or two octets and is used for specific command and reply functions, whereby a sequence number assures the sequence of the messages.

The expansion of the Ethernet Standard in view of the RMAC concept is shown by way of example in FIG. 3b. To that end, a priority mark PM that unambiguously identifies the priority class PKI (i={0, 1, 2, 3}) is entered in the field TYPE.

A data packet having the lowest priority class PK0 is preferably not provided with a priority mark. It is transmitted unmodified according to the Ethernet standard.

FIG. 3b also shows a field FID (flow identifier). This flow identifier unambiguously identifies the sending arrangement. The receiver, preferably the higher layers HL therein, of this data packet provided with the field FID can therefore setup an unambiguous reference to the transmitting, higher layers HL.

The data packet can be an information packet or a signaling packet.

Figure 3D:
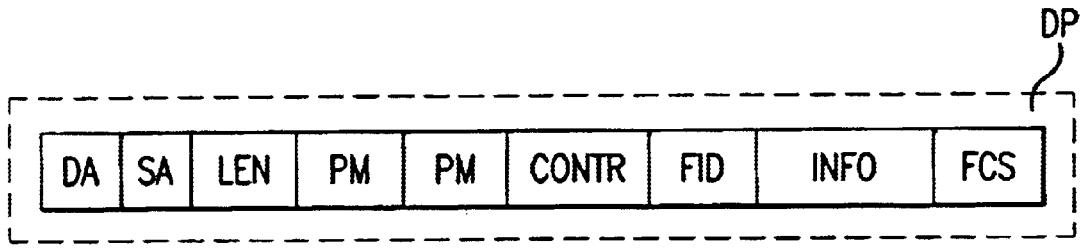

FIG. 3c and FIG. 3d show such signaling packets, whereby the expansion in the sense of the RMAC concept is shown in FIG. 3d for the Ethernet Standard in FIG. 3c. The priority mark PM is contained in the field DSAP. The priority mark PM is also a matter of DSAP or, respectively, SSAP information with additional priority information.

The meanings of the names of the individual fields of FIG. 3d can be seen from the above comments.

Exemplary Embodiment(s) of the Invention

Figure 1:
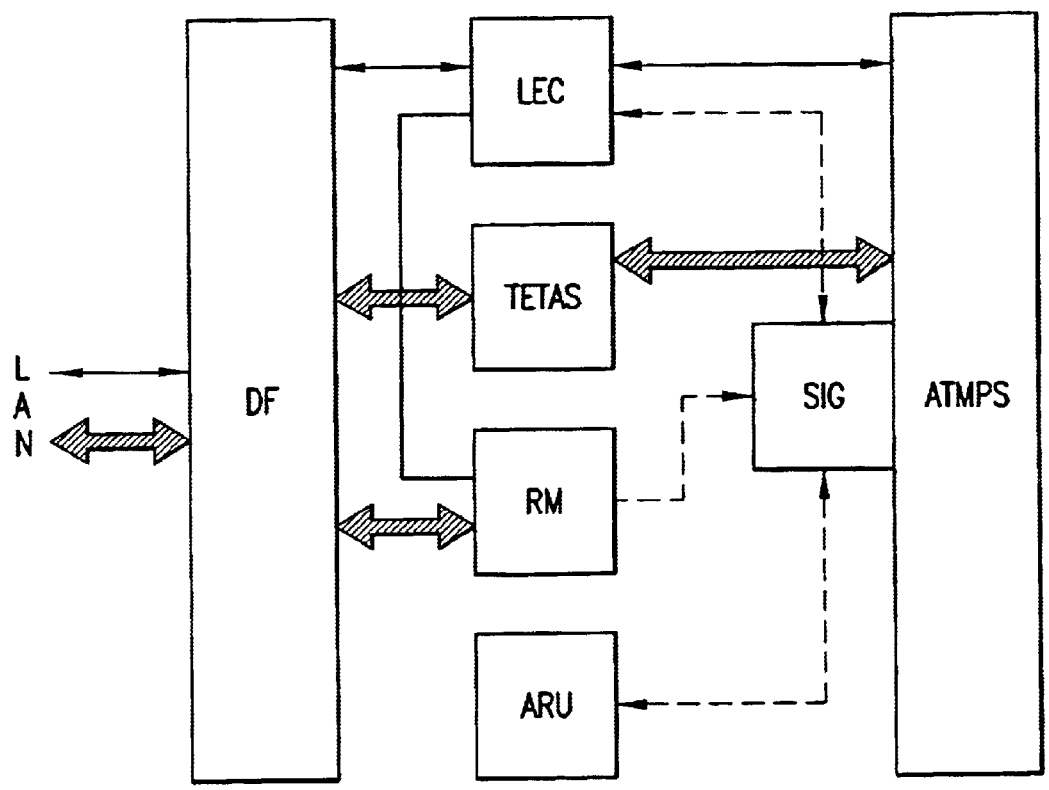
FIG. 1 is a sketch that shows the functionality of the imaging of a quality of service feature from the ATM network into the LAN (and back) in logical blocks.

The data stream present in the Ethernet or Token Ring (LAN) should also be handled according to the prescribable quality of service features upon transition into the ATM network. FIG. 1 shows a general architecture for imaging quality of service features of a traditional LAN expanded in the above-described way (RMAC) into an ATM network. FIG. 1 thereby reproduces a sketch that unites logical functions in blocks without a division of hardware components and/or software components proceeding from this illustration. Such a division is to be left to the respective, specific application and can accordingly vary.

The individual components (blocks) in FIG. 1 are explained below.

A block DF ("Data Forwarder") distinguishes between a high-priority and a low-priority data stream. When it is a low-priority data stream, than a further-handling is initiated in a block LEC ("Lan Emulation Client") (see the description below). When, in contrast, it is a high-priority data stream, a further-handling is initiated in a block TETAS ("Ttransparent Ethernet To ATM Slot") when it is an information packet; otherwise, i.e. given a signaling packet, a further-handling is initiated in a block RM ("Resource Manager").

Resources, for example the bandwith, are managed in the block RM. The goal is to assure a fair assigning of the resources. To that end, the quality of service parameters from the LAN contained in the signaling packet, preferably from the RMAC protocol, are adapted such in the block RM that these quality of service parameters can be converted in the ATM network and, thus, are available in the ATM network.

When the setup of a connection (from the LAN into the ATM network) is not possible, then a corresponding message is communicated to the system that requested the connection (error handling).

When the resource (channel, bandwidth) is available, then the connection is setup to the corresponding quality of service parameters. To that end, a LAN address is converted into an ATM address in order to find the destination on the ATM side. When the ATM address is not locally available, then this must be determined by the block ARU ("Address Resolution Unit").

All operations for low-priority packets are implemented in the block LEC in agreement with the LANE specification. As a result thereof, compatibility to the standardized LAN expansion is assured, this in turn—as initially cited—comprising no adaptation to the quality of service features of the ATM standard. The block LEC manages its own resources, whereby the block RM is informed of these self-managed resources.

Information packets are transparently transmitted from the LAN into the ATM network and back in the block TETAS.

Finally, the address conversion occurs, as mentioned, in the block ARU. An MAC address (Media Access Control) is converted into an ATM address thereat. The address conversion ensues in two stages. First, a server component of the LAN is accessed, the LAN Emulation Server,(LES) in order to implement a standardized LANE address resolution. When no address information is returned from the LES, then the ATM side, preferably the switching centers thereat, requests the corresponding ATM address in a second step. To this end, the desired MAC address is directly encoded into the B-HLI field ("Broadband High Layer Information"), into the octet 6 through 11 of the setup message therein (see ATM Forum: ATM User Network Interface). The connection is accepted only in the switching center that knows the MAC address. All other switching centers reject the connection.

A block SIG ("Signaling") and a block ATMPS ("ATM Protocol Stack") identify the ATM side, whereby the block ATMPS comprises a standardized ATM layer including the AAL-5 layer (see [5]). The block SIG contains the signaling protocols Q.2931 and SSCOP (see [5]).

Although other modifications and changes may be suggested by those skilled in the art, it is the intention of the inventors to embody within the patent warranted hereon all changes and modifications as resonably and properly come within the scope of their contribution to the art.

I claim:

1. A method for imaging a quality of service feature available in a connection-oriented communication network that identifies a high-priority data stream or a low-priority data stream into a connectionless communication network comprising the steps of a) transparently imaging a first, low-priority data stream from the connection-oriented communication network into the connectionless communication network;

b) transparently imaging a first high-priority data stream from the connection-oriented communication network into the connectionless communication network;

c) imaging a second low-priority data stream from the connectionless communication network into the connection-oriented communication network, implementing an address conversion of an address of the connectionless communication network into an address of the connection-oriented communication network;

d) imaging a second high-priority data stream from the connectionless communication network into the connection-oriented communication network, when the second high-priority data stream is a signaling packet, implementing a conversion of a signaling information of the signaling packet from the connectionless communication network into a signaling information available in the connection-oriented communication network; and when the second high-priority data stream is an information packet, implementing a transparent transmission into the connection-oriented communication network.

2. A method according to claim 1, further comprising the steps of:

converting quality of service parameter available in the connectionless communication network from the signaling packet into the connection-oriented communication network in the following steps:

a) defining a suitable bandwidth from total bandwidth available for a new connection;

b) defining the suitable address of the connection-oriented communication network from the address of the connectionless communication network on the basis of an address conversion;

c) when a suitable bandwidth is available and when the address is known in the connection oriented communication network, setting up the new connection; and d) when no suitable bandwidth is available or when the address is unknown in the connection-oriented communication network, then displaying a prescribable error message.

3. A method according to claim 1, wherein the connection-oriented communication network is an ATM network and the address of the connection-oriented communication network is an ATM address.

4. A method according to claim 1, wherein the connectionless communication network is a local area network that is expanded by a quality of service feature of being able to distinguish between a high-priority and a low-priority data stream, and the address of the connectionless communication network is an LAN address.

5. A method according to claim 3, wherein the connectionless communication network is a local area network that is expanded by a quality of service feature of being able to distinguish between a high-priority and a low-priority data stream, and the address of the connectionless communication network is an LAN address, the address conversion is implemented in the following steps:

a) determining the ATM address for the LAN address by an LAN server or b) when the ATM address is not locally available, implementing an inquiry at an ATM server, wherein the ATM address is communicated from the ATM server as a reply.

* * * * *